(12) United States Patent
Hattori

(10) Patent No.: US 6,966,708 B2
(45) Date of Patent: Nov. 22, 2005

(54) FUSION SPLICING DEVICE AND FUSION SPLICING METHOD

(75) Inventor: Kazunari Hattori, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 259 days.

(21) Appl. No.: 10/415,989

(22) PCT Filed: Dec. 4, 2001

(86) PCT No.: PCT/JP01/10580

§ 371 (c)(1), (2), (4) Date: May 6, 2003

(87) PCT Pub. No.: WO02/46814

PCT Pub. Date: Jun. 13, 2002

(65) Prior Publication Data

US 2004/0047572 A1 Mar. 11, 2004

(30) Foreign Application Priority Data

Dec. 5, 2000 (JP) ................................ 2000-369681

(51) Int. Cl.[7] .............................................. G02B 6/255
(52) U.S. Cl. ............................. 385/96; 385/95; 385/97
(58) Field of Search ................................... 385/95–99

(56) References Cited

U.S. PATENT DOCUMENTS

| | | |
|---|---|---|
| 6,341,242 B1 | 1/2002 | Mahmood et al. |
| 6,464,410 B1 * | 10/2002 | Sahinci et al. ................ 385/98 |
| 6,676,307 B1 * | 1/2004 | Yang et al. .................... 385/96 |
| 6,817,785 B2 * | 11/2004 | Tian ............................. 385/96 |

FOREIGN PATENT DOCUMENTS

| | | |
|---|---|---|
| JP | 04-68302 | 3/1992 |
| JP | 08-21923 | 1/1996 |
| JP | P2000-205997 A | 7/2000 |
| WO | WO 98/14810 | 4/1998 |

OTHER PUBLICATIONS

Costin, Hariton, "On Object Classification by Means of Fuzzy Sets' Theory." Pattern Recognition, 1992, vol. 2, Conference B, Pattern Recognition Methodology and Systems, Proceedings 11th IAPR International Conference, IEEE Comput, Soc, Aug. 30, 1992, pp. 458–461, XP010029986, ISBN: 0-8186-2915-0.

* cited by examiner

Primary Examiner—John D. Lee
Assistant Examiner—Tina M Lin
(74) Attorney, Agent, or Firm—McDermott Will & Emery LLP (57) ABSTRACT

A fusion splicing apparatus for fusion splicing end portions of optical fiber by butt discharging. Parameter data of a brightness distribution waveform of optical fiber in cross section is measured from a picked up image. A degree of attribution for the measured parameter data is obtained from fuzzy operation data registered in advance, and the type of the optical fiber is identified through a fuzzy operation. The identified type of the optical fiber is collated with fusion splicing conditions for type of optical fibers registered in advance. The collation result is displayed.

10 Claims, 6 Drawing Sheets

(FIBER ABUTTING SCREEN)

FIG. 3

(BRIGHTNESS DISTRIBUTION WAVEFORM)

FUSION SPLICING DEVICE AND FUSION SPLICING METHOD

FIELD OF THE INVENTION

The present invention relates to an apparatus and method for fusion splicing end portions of optical fibers for communication by discharge heating and the like, and more particularly to an apparatus and method for fusion splicing the optical fibers under fusion splicing conditions suitable for types of optical fibers by automatically determining the types of optical fibers.

BACKGROUND OF THE INVENTION

Along with the expansion and diversification of the optical fiber communications in recent years, various types of optical fibers adapted for respective uses have been developed and utilized. Various types of optical fibers, including a single mode optical fiber (hereinafter referred to as an SM fiber), a multi-mode optical fiber (hereinafter referred to as an MM fiber), a dispersion shifted optical fiber (hereinafter referred to as a DS fiber), and an erbium doped optical fiber (hereinafter referred to as an ED fiber), are provided. When these optical fibers are fusion spliced by a fusion splicing machine, it is required to make splicing under the fusion splicing conditions (discharge current, discharge time, etc.) suitable for each optical fiber. However, the type of the optical fiber may be mistaken, in which there is the risk that a splicing failure occurs due to unsuitable fusion splicing conditions for the optical fibers.

The fusion splicing of the optical fibers is not necessarily conducted under the light working environment, but may be conducted under the dark environment within a manhole, for example. In this case, the coating material of the optical fiber may be colored to identify the type of optical fiber, but recognized by mistake. If image observing means of high resolution and high magnification is employed for an image monitor of the fusion splicing machine, a core portion as minute as 3 to 10 $\mu$m can be observed, but the optical fibers of similar profiles may be recognized by mistake.

If the optical fibers are not spliced under the fusion splicing conditions suitable for the type of optical fiber, a splicing loss is greater, whereby the splicing of optical fibers must be made again from the beginning. To make splicing again, a series of operations, including the removal of a falsely spliced portion, the removal of the coatings for the end portion of optical fiber and cutting the end portion must be performed from the beginning, resulting in a worse working efficiency, and the operator becomes nervous.

One of the conventional techniques to solve the above problem is well-known in which the optical fibers are spliced under the optimal fusion splicing conditions by identifying the type of optical fiber through image processing, as disclosed in JP-A-8-21923. This conventional technique involves identifying the brightness level profile of the optical fiber observed at the fusion spliced portion through image processing. Then the brightness level profile (hereinafter referred to as a brightness profile) for each of various types of optical fiber is previously stored. Thereafter, the type of optical fiber is designated by collation with the brightness profile of optical fiber to be fusion spliced. The optical fibers are fusion spliced by designating the type of optical fiber and selecting the optimal fusion splicing conditions from among the stored fusion splicing conditions for each type of optical fiber.

However, when the type of optical fiber is estimated by obtaining the brightness profile from an observed image of the optical fiber, there are various intricate factors such that the brightness profile may be varied or different between the same type of optical fibers, depending on the focus or optical characteristics of the observed image, and the manufacturing conditions of the optical fiber. The conventional technique shows an example of a fusion splicing machine for ribbonized optical fiber, in which image observing means, typically with a low magnification and a long depth of focus, has a small numerical aperture of 0.1 or less. Hence, the resolution can not be sufficiently obtained, whereby it is difficult to acquire the detailed information from the brightness profile.

Even if image observing means with high magnification and high resolution is employed for image observation, a DS fiber and an ED fiber, for example, have both a core diameter of 4 $\mu$m, with quite similar brightness profiles, and practically is difficult to discriminate from the comparison between the brightness profiles. In the conventional technique, the comparison between the brightness profiles is made employing the interval between displaced points near the center of fiber axis. Accordingly, although this technique is effective when the brightness profile is clearly different depending on the type of optical fiber, it is difficult to discriminate all the types of optical fiber.

The present invention has been achieved in the light of the above-mentioned circumstance, and it is an object of the invention to provide an apparatus and method for fusion splicing the optical fibers under the fusion splicing conditions suitable for respective optical fibers in which the types of optical fibers can be fully discriminated.

SUMMARY OF THE INVENTION

The present invention provides a fusion splicing apparatus for fusion splicing end portions of optical fibers by butt discharging, characterized by comprising an image observing mechanism for observing the end portions of the optical fibers, an image processing section for measuring parameter data of a brightness distribution waveform of optical fiber in cross section from a picked up image, a fuzzy operation section for obtaining a degree of attribution for the measured parameter data from a fuzzy operation data registered in advance in a data registering section and identifying the type of optical fiber through a fuzzy operation, a collating section for collating the identified type of optical fiber with fusion splicing conditions for each type of optical fiber registered in advance in a fusion splicing condition registering section, a display unit for displaying a collation result, a fusion splicing mechanism, and a control section.

Also, this invention provides a fusion splicing method for fusion splicing end portions of optical fibers by butt discharging, characterized by including observing the end portions of the optical fibers in an image observing mechanism, measuring parameter data of a brightness distribution waveform of optical fiber in cross section from a picked up image in an image processing section, obtaining a degree of attribution for the measured parameter data from fuzzy operation data registered in advance and identifying the type of optical fiber through a fuzzy operation in a fuzzy operation section, collating the identified type of optical fiber with fusion splicing conditions for each type of optical fiber registered in advance in a collating section, displaying the collation result, and fusion splicing the optical fibers in a fusion splicing mechanism.

In these drawings, reference numeral 1 denotes an image observing mechanism, 2 denotes an image processing section, 3 denotes a data registering section, 4 denotes a fuzzy operation section, 5 denotes a fusion splicing condition registering section, 6 denotes a collating section, 7 denotes a monitor display unit, 8 denotes a control section, 9 denotes a fusion splicing mechanism, 11 denotes an optical fiber, 12 denotes a microscope, 13 denotes a light source, 14 denotes a mirror, and 15 denotes a focus driving section.

BEST MODE FOR CARRYING OUT THE INVENTION

Figure 1:
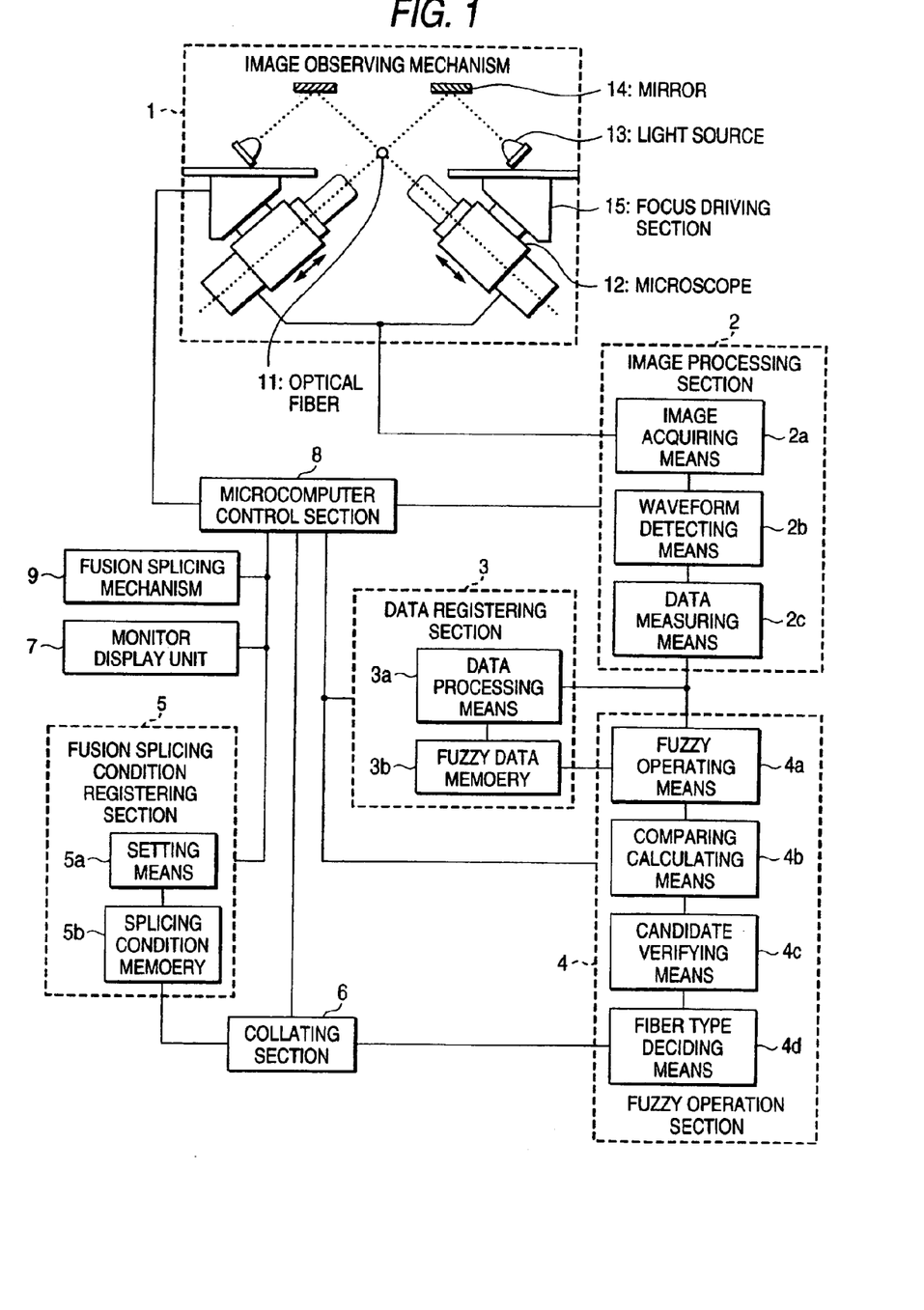
FIG. 1 is a block diagram for explaining an embodiment of the present invention.

FIG. 1 is a block diagram for explaining an embodiment of the present invention. In FIG. 1, reference numeral 1 denotes an image observing mechanism, 2 denotes an image processing section, 3 denotes a data registering section, 4 denotes a fuzzy operation section, 5 denotes a fusion splicing condition registering section, 6 denotes a collating section, 7 denotes a monitor display unit, 8 denotes a control section, 9 denotes a fusion splicing mechanism, 11 denotes an optical fiber, 12 denotes a microscope, 13 denotes a light source, 14 denotes a mirror, and 15 denotes a focus driving section.

The image observing mechanism 1 picks up an image of a pair of optical fibers 11 butted and held by the fusion splicing mechanism (not described in detail and not shown) from two directions using the microscopes 12 with the CCD cameras disposed orthogonal to each other. The light source 13 for illumination to pick up the image is disposed to illuminate the optical fiber 11 via the mirror 14 from the background side. The microscope 12 of high magnification and high resolution has the focus driving section 15 for adjusting the focal point, which is controlled by the control section 8 with a microprocessor.

An optical fiber image observed by the microscope 12 is measured to acquire the predetermined data of optical fiber from the brightness distribution waveform in the image processing section 2. For the measured data, a degree of attribution is calculated by referring to the data of a fuzzy data memory registered in advance in the data registering section 3 in the fuzzy operation section 4. The degree of attribution for each of a plurality of types of optical fiber is compared and calculated to select a candidate for the type of optical fiber, verify the validity of the candidate and decide the type of optical fiber.

If the type of optical fiber is decided, the collating section 6 collates the type of optical fiber and the fusion splicing conditions of that type registered in advance in the fusion splicing condition registering section 5. If the fusion splicing conditions are matched with the set conditions, the optical fibers are spliced under the set fusion splicing conditions using the fusion splicing mechanism 9. If the fusion splicing conditions are unmatched with the set conditions, an instruction for retry or splicing is made. The collation result of the collating section 6 is displayed on the monitor display unit 7. The execution of fusion splicing is made under the registered fusion splicing conditions by controlling the fusion splicing mechanism 9 in the control section 8 with the microprocessor. The details of each section will be described below.

First of all, the image processing section 2 comprises image acquisition means 2a for acquiring the optical fiber image picked up by the image observing mechanism 1, waveform detecting means 2b for detecting the image as a brightness distribution waveform (hereinafter referred to as a brightness profile), and data measuring means 2c for measuring the data from the brightness profile.

Figure 2:
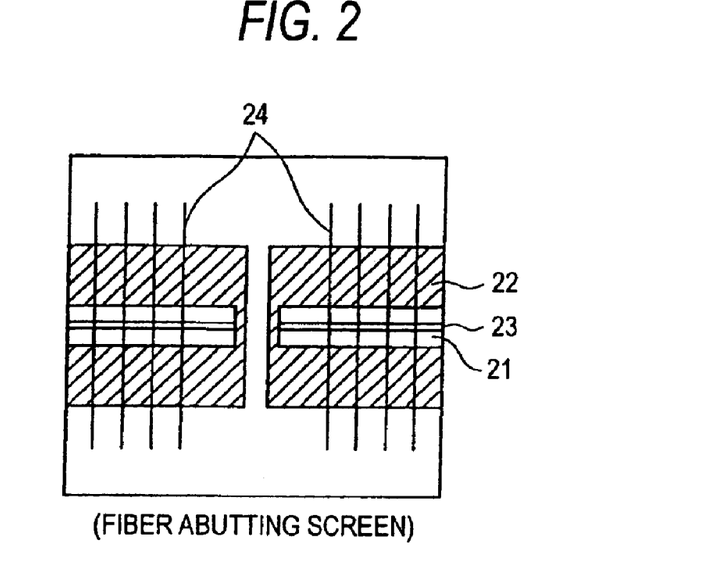
FIG. 2 is a view showing a picked up image.

FIG. 2 is a view showing an image pick-up screen of the optical fibers to be acquired by the image acquisition means 2a. In FIG. 2, the ends of a pair of optical fibers to be fusion spliced are butted before being fusion spliced. Light passing through the optical fiber is condensed because the optical fiber serves as a rod lens, and has a brightness distribution where light is centrally condensed. Therefore, the transmitting light is condensed in the dark portion as a shadow against the background light brightness.

On the image pick-up screen, a strip image is displayed, consisting of a bright portion 21 of the transmitting light appearing horizontally in the central section and a dark portion 22 as a shadow appearing on both the upper and lower sides of the bright portion 21. A brighter portion 23 appears in the center of the bright portion due to a core portion having a different refractive index. This picked up image is extracted along a sampling line 24 and arithmetically operated to obtain the brightness profile. The sampling is made at several points (four to five points), whereby the average value data is obtained.

Figure 3:
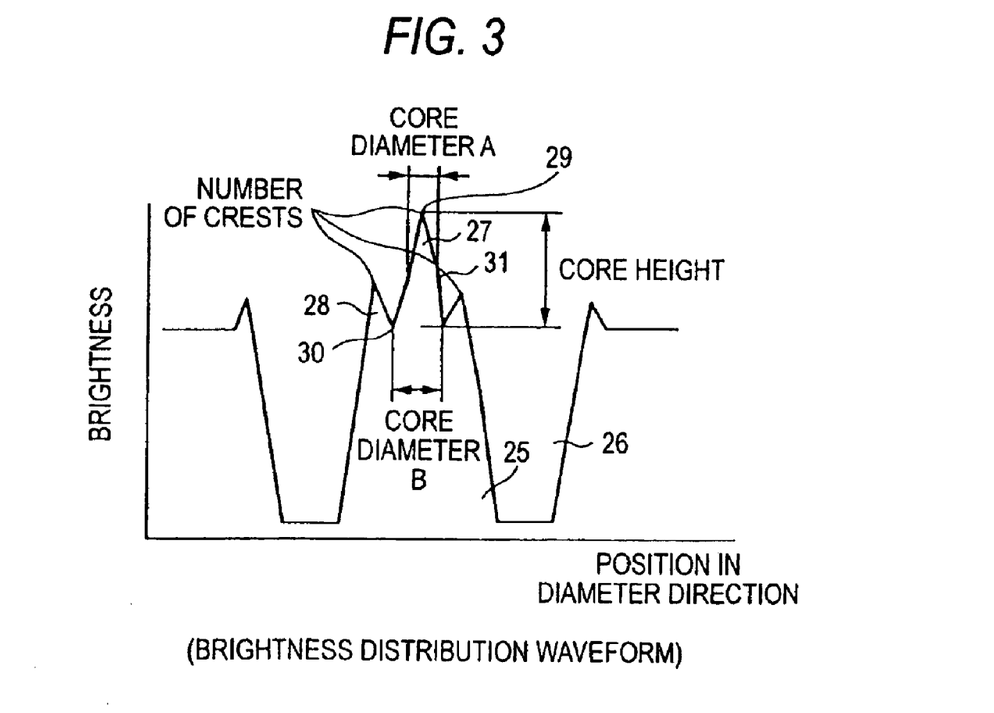
FIG. 3 is a graph for explaining a brightness distribution waveform.

FIG. 3 is a graph showing the brightness profile of the optical fiber in cross section for the image of FIG. 2, in which the brightness of the optical fiber is indicated along the longitudinal axis and the position in diameter direction is indicated along the transverse axis. This brightness profile consists of a bright portion 25 in the central section, a dark portion 26 on both sides thereof, and a bright portion indicating the background brightness in its outside. The bright portion 25 in the central section has a projecting crest 27 in the center, and crests 28 on the left and right sides thereof. The number of crests, its interval and the height of crest may be different depending on the type of optical fiber. The central crest 27 indicates the core portion, and is relatively easily identified to be located almost in the center of the optical fiber. A trough 30 is also easily recognized on both sides of the central crest 27.

Figure 4:
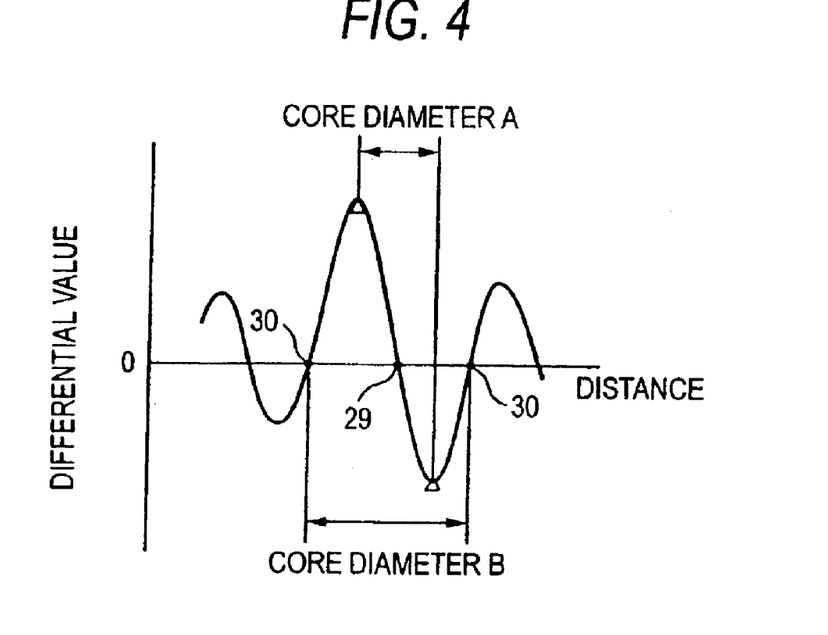
FIG. 4 is a graph for explaining a differential waveform of the brightness distribution waveform.

Differentiating the brightness profile of FIG. 3, a differential value waveform is obtained as shown in FIG. 4. The position and number where the differential value is equal to zero are different depending on the number of crests, but a vertex position 29 of the crest 27 for the core portion is easy to obtain. The distance between the maximum differential values across the vertex position 29 as the center where the differential value is zero is defined as a core diameter A, and the distance between the differential values of zero on both sides of the vertex position 29 is defined as a core diameter B. As shown in FIG. 3, the core diameter A indicates a variable density boundary distance (width) at the middle abdomen of the crest 27 in the core portion, and the core diameter B indicates a distance between the troughs 30.

Also, the number of crests is equal to the number of peaks in the angular waveform, and a brightness difference (or a core height) between the vertex position 29 of the crest 27 and the trough 30 in the core portion is measured and acquired as the data. Besides, the height of crest 27 may be represented by the brightness level from the dark portion 26, but not from the trough 30, or the contrast may be obtained as the data.

Usually, the SM fiber has a waveform of three crests as shown in FIG. 3, in which a central crest indicates the core portion. Each of the DS fiber and the ED fiber has actually a small core diameter and a large difference in refractive index between the core and the cladding, whereby the central crest 27 for the core portion is slender and higher. Further, since the refractive index distribution is convex, the light condensing is so complex that the bottom of the crest is spread or the number of crests is increased. On the other hand, the MM fiber (GI type) has a refractive index that gradually changes, with the height of crest tending to decrease conspicuously.

In this manner, the brightness profile of optical fiber is different depending on the type of optical fiber, and measured by the data measuring means 2c. The degree of attribution is substituted for the data measured from the brightness profile by the fuzzy operation section 4. The type of optical fiber is identified from the degree of attribution obtained. In making a fuzzy operating process, it is required to prepare for the membership function. Turning back to FIG. 1, the data registering section 3 will be described below.

The data registering section 3 stores in advance the data for discriminating the types of optical fibers to be fusion spliced. The data registering section 3 includes data processing means 3a and a fuzzy data memory 3b. The data processing means 3a creates the membership function data by calculating an average value and a standard deviation value from the data measured by the image processing section. Also, it acquires the newly measured data as the additional data and updates the data. The fuzzy data memory 3b accumulates the optical fiber type data subjected to the fuzzy operation by the data processing means and is used for calculating the degree of attribution for the optical fiber that is newly measured.

Figure 5:
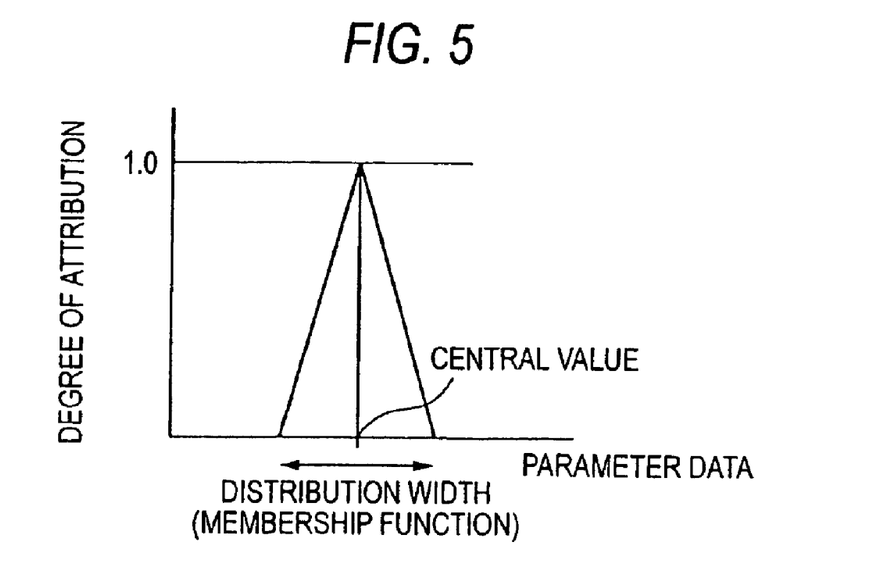
FIG. 5 is a graph for explaining a membership function.

FIG. 5 is a typical example of the membership function useful in the fuzzy operation of the invention, in which the membership function is a convex type. This function represents the fuzziness of data in the distribution width, and has a probability that the degree of attribution is one at the central value. However, other forms or the general fuzzy theory may be employed, so long as the distribution of data is represented by the function. The membership function of FIG. 5 is represented by a triangle with a vertex at the central value and the distribution width as the bottom side, in which the degree of attribution is taken along the longitudinal axis, and the parameter data along the transverse axis. The central value is an average value of data and the distribution width is a standard deviation value. By making the distribution width several times (e.g., five times on one side) the standard deviation value, the membership function is so reasonable that measurement values are not deviated from the average value and do not become zero over the broad range.

Figure 6:
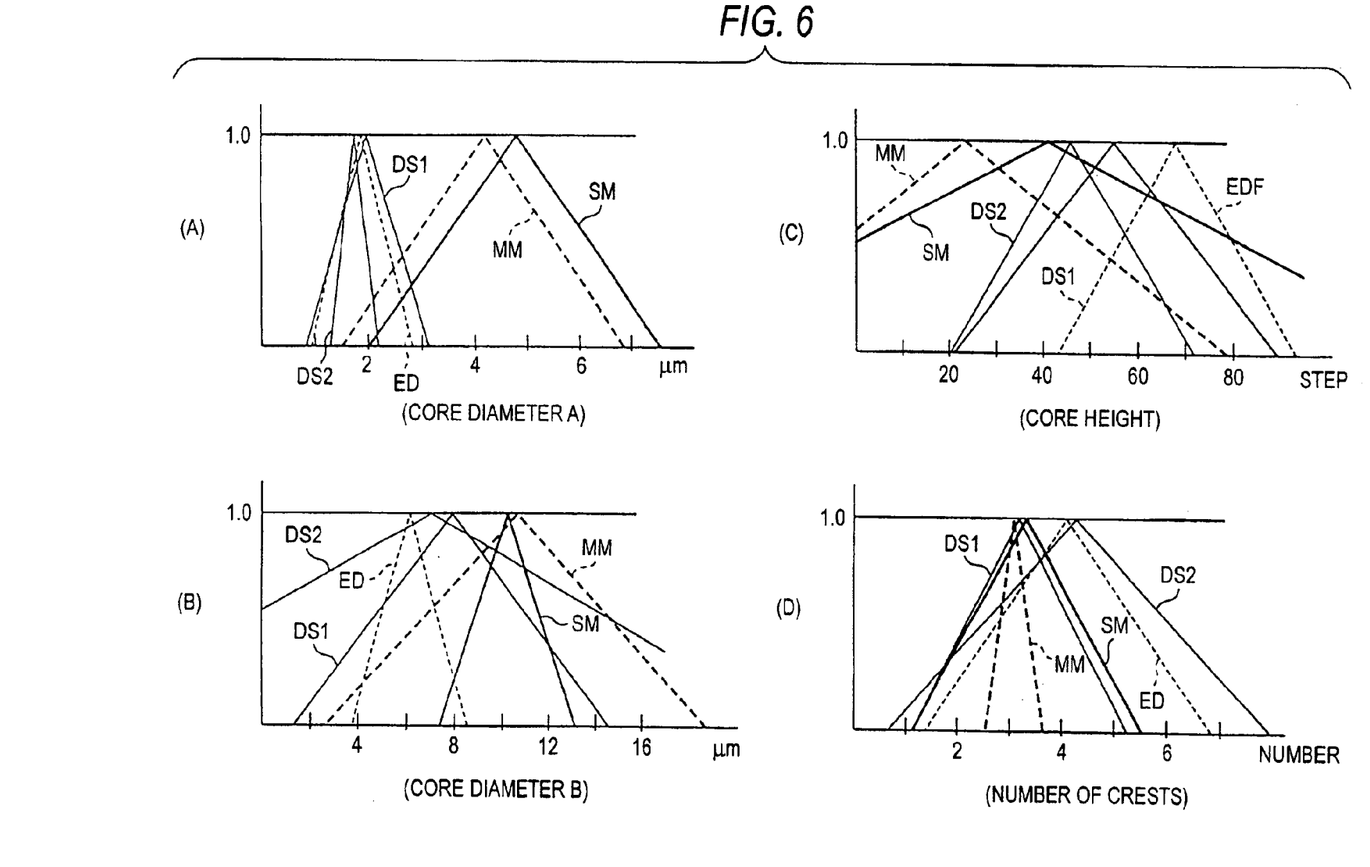
FIG. 6 is a graph for showing a specific example of the membership function.

FIG. 6 shows the examples of the membership function from the actual measurement data. FIG. 6(A) is a membership function with the core diameter A, FIG. 6(B) is a membership function with the core diameter B, FIG. 6(C) is a membership function with the core height, FIG. 6(D) is a membership function with the number of crests. As will be seen from these figures, in the core diameter B (distance between the troughs 30 in FIG. 3), there is no vivid difference between the SM fiber and the MM fiber, and in the core diameter A, there is also no apparent difference between the DS fiber (DS1 indicates an ordinary dispersion shifted optical finer and DS2 indicates a dispersion shifted optical fiber of core expansion type) and the ED fiber, when the standard deviation is included. In creating the membership function, the application range may be misjudged to be narrow.

Figure 7:
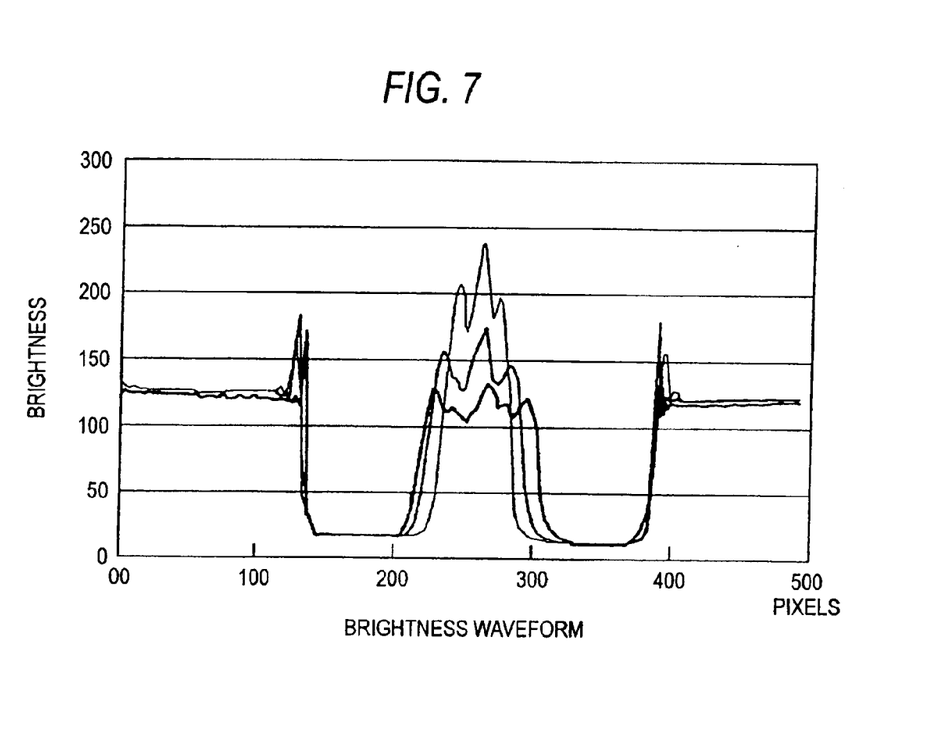
FIG. 7 is a graph for explaining a deviation of the brightness distribution waveform.

FIG. 7 is a graph showing the variation of the brightness profile when the focus positions (three positions) of the SM fiber are changed. As shown in FIG. 7, the brightness profile is varied by changing the focus position for picking up the image even with the exactly same optical fiber. Accordingly, it is necessary to extend the distribution width of the membership function by intentionally dispersing the profile, including the values measured at the positions before and after the focus set-up position, to increase the adaptability.

The membership function is necessary to be created in advance from the known data or by the data registration. However, when the fusion splicing is made by newly discriminating the type of optical fiber, it is possible that the measured data for discrimination is newly added to the already existing membership function. Also, the types of optical fiber can be further distinguished by adding the new fiber as defined by the user successively and learning it. By the successive addition of data, the amount of database for discrimination can be increased, and the type of optical fiber can be identified more minutely and precisely.

The additional data can be managed in accordance with the following expression, $$AV_{n+1} = (n \cdot AV_n + D_{n+1})/(n+1) \qquad (1)$$

$$\sigma_{n+1}^2 = [(n-1) \cdot \sigma_n^2 + n \cdot AV_n^2 + D_{n+1}^2 - (n+1) \cdot AV_{n+1}^2]/n \qquad (2)$$

where n is the number of data, $AV_n$ is an average value, $\sigma_n$ is a standard deviation value, and $D_{n+1}$ is the addition data.

Herein, if the number n, the average value and the standard deviation value are already known, the optimization can be performed due to the addition of data. Since the weight in adding the data is changed by changing the number n, the extent of adaptability or the learning speed (number of additions) can be set up.

Turning back to FIG. 1, the fuzzy operation section 4 for discriminating the type of optical fiber will be described below. The fuzzy operation section 4 includes fuzzy operating means 4a, comparing calculating means 4b, candidate verifying means 4c and fiber type deciding means 4d. The fuzzy operating means 4a substitutes the degree of attribution for the data measured by the image processing section 2. The substitution of the degree of attribution is made for the measured data as the type of optical fiber from the membership function of FIG. 6 stored in the fuzzy data memory 3b.

Table 1 lists an instance of calculating the degree of attribution. The numerical values of Table 1 are only exemplary for explanation, but differ from the actual values.

TABLE 1

| Type | Number of crests (3) | Core diameter B (9 μm) | Core height (60) | Minimum |
|---|---|---|---|---|
| SM | 0.8 | 0.5 | 0.8 | 0.5 |
| MM | 0.9 | 0.8 | 0.3 | 0.3 |
| DS1 | 0.9 | 0.8 | 0.9 | 0.8 |
| ED | 0.5 | 0 | 0.8 | 0 |
| | | | Maximum | 0.8 |

The calculation of Table 1 will be described below. Assuming that the number of measured crests for the bright portion is three, it will be found from the membership function of FIG. 6D that the SM fiber, the MM fiber, the DS1 fiber and the ED fiber have the degrees of attribution of 0.8, 0.9, 0.9 and 0.5, respectively. Similarly, assuming that the core diameter B is 9 μm, and the core height is 60 steps, those optical fibers have the degrees of attribution for the type of optical fiber as listed in Table 1, which are calculated from the membership function for each parameter of FIG. 6.

The numerical values calculated by the fuzzy operating means 4a are employed by the comparing calculating means 4b to select a candidate for the type of optical fiber of measured data. The candidate selection is made using a minimum/maximum method. This minimum/maximum method involves firstly selecting the minimum degree of attribution for each type of optical fiber. In Table 1, the SM fiber is 0.5 for the core diameter B, the MM fiber is 0.3 for the core height, the DS1 fiber is 0.8 for the core diameter B, and the ED fiber is zero for the core diameter B. Then, the maximum degree of attribution is selected from among the minimum degrees of attribution for each type of optical fiber. That is, since the maximum degree of attribution is 0.8 for the DS1 fiber, it is judged that the candidate for the type of optical fiber is the DS1 fiber.

An arithmetical expression for the minimum/maximum method is represented in the following manner. Herein, F is a degree of confidence having a numerical value of the degree of attribution, m is a membership function, "i, j, k, l, . . . " are parameters, and t is the type of optical fiber.

$$F = \max[\min(m_i, t, m_j, t, m_k, t, m_l, t, \ldots)]t$$

The type of optical fiber as determined in the above manner is verified by the candidate verifying means 4c. The verification of the candidate is uncertain, when the degree of attribution for the type of optical fiber determined as the candidate is small, because the degree of attribution selected for the candidate is the degree of confidence. Accordingly, if a threshold is set for the degree of attribution, the identification of the candidate may be unclear when the candidate has the degree of attribution smaller than this threshold. In selecting the candidate with the maximum degree of attribution, two candidates having the same maximum degree of attribution or with a smaller difference in the degree of attribution between the first and second candidates than a certain value, if any, are displayed. In this case, the type of optical fiber may be decided by making the measurement again, or on the basis of the ranking.

As a result that the type of optical fiber is verified by the candidate verifying means 4c, if the verification is good, the candidate is decided by the fiber type deciding means 4d. A Table 2 below lists the results of sampling test, which are almost satisfactory. The precision of identification can be further raised by addition and accumulation of data, as previously described.

TABLE 2

| Fiber Type | Number of Correct | Correct Answer Ratio |
|---|---|---|
| SM | 36/36 | 100% |
| MM | 35/36 | 97% |
| DS1 (Normal type) | 34/36 | 94% |
| DS2 (Expanded core area type) | 36/36 | 100% |
| ED | 35/36 | 97% |

Figure 8:
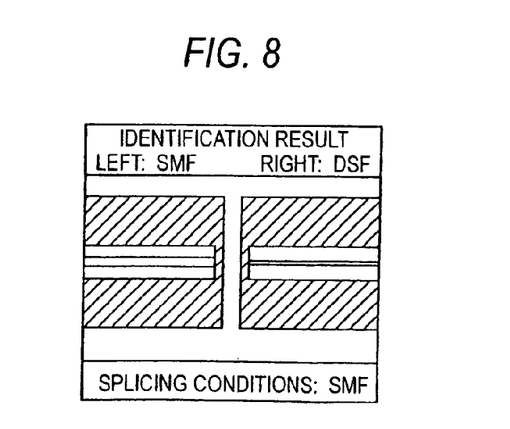
FIG. 8 is a view displaying the result of discriminating the type of optical fiber.

The result of determining the type of optical fiber is displayed, along with the fiber image, on the monitor display unit 7, as shown in FIG. 8. The determination for the type of optical fiber is made separately for each of the left and right optical fibers. The type of optical fiber is displayed for each of the left and right optical fibers, in which the splicing conditions may be displayed. The operator may be prompted to perform the fusion splicing or retry by once interrupting the operation during this display. In deciding the type of optical fiber, the type of optical fiber and the measurement data are added to the data registering section 3.

If the type of optical fiber is decided, the type of optical fiber is collated by the fusion splicing condition registering section 5 and the collating section 6. The fusion splicing condition registering section 5 includes setting means 5a for inputting the splicing conditions and a memory 5b for storing the splicing conditions. The splicing conditions include the preheating time, end face spacing, discharge current, and discharge time for each type of optical fiber, for example.

After the type of optical fiber and the fusion splicing conditions are collated by the collating section 6, the fusion splicing is performed automatically or by confirmation of the operator. If the collation results are matched with the type of optical fiber and the fusion splicing conditions selected beforehand by the operator prior to splicing, the fusion splicing is automatically performed without interruption. In this case, the results are not displayed on the monitor display unit 7, thereby lightening the labor of the operator. Only if the collation results are unmatched with the type of optical fiber and the fusion splicing conditions, the results are displayed on the monitor display unit 7 to prompt the operator to perform the fusion splicing or retry in accordance with the display contents. The fusion splicing itself is performed by driving the fusion splicing mechanism 9 (not shown in detail) on the basis of the above-mentioned fusion splicing condition under the control of the control section 8 with microprocessor, employing the well-known method and mechanism.

Figure 9:
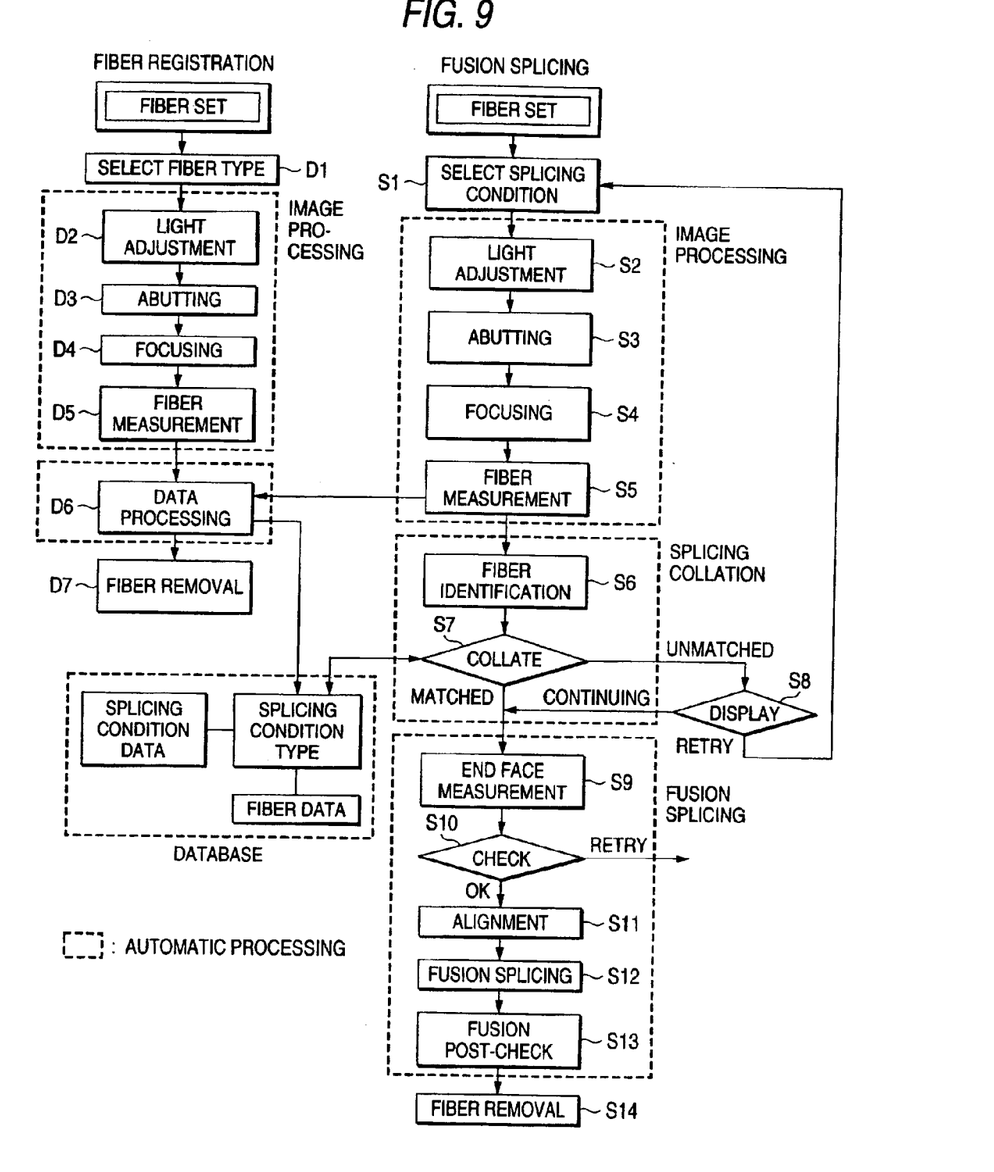
FIG. 9 is a flowchart showing the embodiment of the invention.

Referring to a flowchart of FIG. 9, a fusion splicing method of the invention will be described below. In FIG. 9, the automatic processing is shown within the frame of the dotted line, and the manual processing is shown outside the frame. A flow of fiber registration to create the fiber data for determining the type of optical fiber is shown on the left side of the flowchart, and a flow of fusion splicing is shown on the right side.

First of all, the flowchart of the fiber registration on the left side will be described below. Herein, a pair of optical fibers with clear type of optical fiber are set in the fusion splicing apparatus, as is the case of fusion splicing. Firstly, the optical fibers are set. Then, at step S1, the type of optical fiber (one of the choices if already known or its name if unknown) is selected and input. The next steps D2 to D5 involve the image processing of optical fiber.

At step D2, light adjustment is made by the image observing mechanism (FIG. 1) so that an observed picked-up image of the optical fiber may be in an optimal state. Then, at step D3, the butt position is adjusted so that the pick up position of the optical fiber may be located in the center of the screen to be easily observed. Thereafter, at step D4, focusing is made to set the focal point of observed image at a preset focus position.

At step D5, the data of the optical fiber is measured. The data measurement is made by sampling several points on a butt screen (FIG. 2) of the optical fiber and creating the brightness profile (FIG. 3) of the optical fiber through the image processing. A differentiating processing (FIG. 4) is performed on the basis of this brightness profile to acquire the parameter data, including the core diameter, core height and the number of crests.

At step D6, the measured data is processed. The data processing involves creating the membership function (FIGS. 5 and 6) on the basis of the measured data, in which the created data is registered as the fiber data in the database. Thereafter, at step D7, the optical fiber is removed from the fusion splicing apparatus.

A flow of the fusion splicing on the right side will be described below. Herein, the type of optical fiber may be already known but uncertain, or unknown absolutely. A pair of optical fibers to be fusion spliced are set in the fusion splicing apparatus as is the case with the fiber registration. After the optical fibers are set, at step S1 firstly, the fusion splicing conditions are selected and input. The fusion splicing conditions that are relevant with the type of optical fiber maybe selected by the type of optical fiber. The fusion splicing conditions are selected from among the pieces of splicing condition data registered in the database on the basis of the presumption of the type of optical fiber, if it is estimated in advance. If the type of optical fiber is unknown absolutely, an item "automatic selection" provided on the selection menu may be chosen.

The light adjustment at step S2, the butting at step S3, the focusing at step S4, and the fiber measurement at step S5 are involved in the image processing as previously described, with the exactly same flow as the fiber registration, and not described here. The data measured in the fiber measurement at step S5 may be added to the database, as needed, or the processing of fiber registration at step D6 may be performed in parallel.

The steps S6 to S8 are involved in the determination of the type of optical fiber and the splicing collation of the fusion splicing conditions. At step S6, the type of optical fiber that has been set is identified. Identification of the type of optical fiber is made by calculating the degree of attribution for the data measured at step S5 by referring to the fuzzy operated data (FIG. 6) in the database, and identifying the type of optical fiber by the minimum maximum method.

After the fiber type is identified at step S6, the fusion splicing conditions for each type of optical fiber registered in the database are collated. If they are matched with the fusion splicing conditions selected at step S1, the operation proceeds to the next fusion splicing processing. If unmatched with the fusion splicing conditions selected at step S1, the collation result is displayed on the display unit at step S8. If the splicing is determined to be unsuitable from the displayed data, the operation returns to step S1 to set the fusion splicing conditions again. If it is determined that the splicing is possible though the displayed data is unmatched, the operation proceeds to the next fusion splicing processing.

The next steps S9 to S13 involve performing the fusion splicing of the optical fibers by the well-known method.

First of all, in measuring the end face of optical fiber at step S9, the end face spacing between optical fibers, the end face shape of the optical fiber, and attachment of dust are measured. At step S10, if the end face shape is checked to be false, the optical fiber is removed from the apparatus, and cut again. If there is no abnormality on the end face of optical fiber, the optical fibers are aligned with their axes at step S11. Subsequently, at step S12, the optical fibers are fusion spliced at a discharge current and for a discharge time set in the fusion splicing conditions. And in the check after fusion splicing at step S12, appearance of the spliced portion for thickness or thinness, the mixture of dust and air bubbles, the inclination of core portion, and misalignment are checked. Thereafter, at step S14, the optical fiber is removed from the fusion splicing apparatus.

A single core optical fiber has been described above, but the invention is also applicable to a ribbonized optical fiber, employing the image observing mechanism with high magnification. In this case, if the ribbonized optical fiber is apparently composed of optical fibers of the same kind, one of the ribbonized optical fibers may be subjected to the identification processing.

Though this invention has been described above in connection with the specific embodiments, it will be apparent to those skilled in the art that various variations or modifications may be made thereto without departing from the scope or spirit of the invention.

This application is based on JP-A-2000-369681, dated on Dec., 5, 2000, its contents being incorporated herein by reference.

<Industrial Applicability>

As will be apparent from the above description, with this invention, the optical fibers can be suitably fusion spliced by identifying all the types of optical fibers correctly and selecting the fusion splicing conditions suitable for the type of optical fiber. Also, it is possible to add to the database for identification automatically, and increase the identification precision.

What is claimed is:

1. A fusion splicing apparatus for fusion splicing end portions of optical fibers by butt discharging, characterized by comprising:

an image observing mechanism for observing the end portions of the optical fibers;

an image processing section for measuring a parameter data of a brightness distribution waveform of optical fiber in cross section from a picked up image;

a fuzzy operation section for obtaining a degree of attribution for the measured parameter data from a fuzzy operation data registered in advance in a data registering section and identifying the type of optical fiber through a fuzzy operation;

a collating section for collating the identified type of optical fiber with fusion splicing conditions for each type of optical fiber registered in advance in a fusion splicing condition registering section;

a display unit for displaying the collation result;

a fusion splicing mechanism; and a control section.

2. The fusion splicing apparatus according to claim 1, characterized in that said parameter data includes at least the number of crests, a core diameter, and a core height of said brightness distribution waveform.

3. The fusion splicing apparatus according to claim 2, characterized in that said data registering section comprises data processing means for retrieving said parameter data and creating the fuzzy operation data.

4. The fusion splicing apparatus according to claim 1, characterized in that the fuzzy operation data registered in advance is a membership function of an average value and a standard deviation value for the parameter data of the brightness distribution waveform of the optical fiber in cross section.

5. A fusion splicing method for fusion splicing end portions of optical fibers by butt discharging, characterized by including:

observing the end portions of said optical fibers in an image observing mechanism;

measuring a parameter data of a brightness distribution waveform of optical fiber in cross section from a picked up image in an image processing section;

obtaining a degree of attribution for the measured parameter data from a fuzzy operation data registered in advance and identifying the type of optical fiber through a fuzzy operation in a fuzzy operation section;

collating the identified type of optical fiber with fusion splicing conditions for each type of optical fiber registered in advance in a collating section;

displaying the collation result; and fusion splicing the optical fibers in a fusion splicing mechanism.

6. The fusion splicing method according to claim 5, characterized in that said parameter data includes at least the number of crests, a core diameter, and a core height of said brightness distribution waveform.

7. The fusion splicing method according to claim 5 or 6, characterized in that the fuzzy operation data registered in advance is a membership function of an average value and a standard deviation value for the parameter data of the brightness distribution waveform of the optical fiber in cross section.

8. The fusion splicing method according to claim 7, characterized in that said membership function involves the parameter data where said brightness distribution waveform has a focal point for picking up an optical fiber image shifted from a set-up position.

9. The fusion splicing method according to claim 7, characterized in that said membership function has additionally said measured parameter data of the optical fiber to be fusion spliced newly.

10. The fusion splicing method according to claim 5, characterized in that if the collation result of the splicing conditions for the identified type of optical fiber is matched with the preset splicing conditions, the fusion splicing is performed without displaying the collation result.

* * * * *